United States Patent [19]

Jorgensen

[11] Patent Number: 5,331,999

[45] Date of Patent: * Jul. 26, 1994

[54] PNEUMATIC PRESSURE RELIEF ASSEMBLY

[76] Inventor: William F. Jorgensen, 897 Wescott Sq., Eagan, Minn. 55123

[*] Notice: The portion of the term of this patent subsequent to May 18, 2010 has been disclaimed.

[21] Appl. No.: 5,020

[22] Filed: Jan. 15, 1993

Related U.S. Application Data

[62] Division of Ser. No. 792,242, Nov. 14, 1991, Pat. No. 5,211,192.

[51] Int. Cl.⁵ .............................................. F16K 21/02
[52] U.S. Cl. ................................................... 137/513.5
[58] Field of Search ................. 137/513.3, 513.7, 513.5

[56] References Cited

U.S. PATENT DOCUMENTS

| | | | |
|---|---|---|---|
| 834,855 | 10/1906 | Woodman et al. | 137/513.5 X |
| 1,640,620 | 8/1927 | Shaff | 137/513.5 |
| 2,461,206 | 2/1949 | Fouse et al. | 137/513.3 X |
| 2,761,469 | 9/1956 | Hansen | 137/513.5 X |
| 3,459,403 | 8/1969 | Royer | 137/513.5 X |
| 3,901,475 | 8/1975 | Dreibelbis | 137/513.5 X |
| 3,920,042 | 11/1975 | Blatt | 137/513.5 X |
| 4,852,602 | 8/1989 | McKinnon | 137/513.5 X |
| 5,004,010 | 4/1991 | Huet | 137/513.3 |
| 5,211,192 | 5/1993 | Jorgensen | 137/513.5 |

Primary Examiner—John Rivell
Attorney, Agent, or Firm—Keith J. Goar

[57] ABSTRACT

Apparatus and method are disclosed by which a pent up supply of compressed air in a pneumatic supply line is slowly bled off after the line is disconnected from its air supply source. The apparatus and method are well adapted for use in pneumatic tool lines. The invention includes a housing which may be inserted in a line attached to a supply of high pressure air, such as a pneumatic line. Flow restriction means are contained in a passageway within the housing for permitting the relatively free flow of pressurized air in one direction, such as is needed to operate a pneumatic tool, and for partially restricting the flow of air in the opposite direction once the line has been disconnected from its supply source. The flow restriction means incorporate a movable member which allows air to freely flow around it when the line is operating a tool, but allows only limited air flow in the opposite direction when the moveable member is forced against a seat, thus gradually, rather than immediately, releasing compressed air trapped in the line to avoid fishtailing of the line.

4 Claims, 2 Drawing Sheets

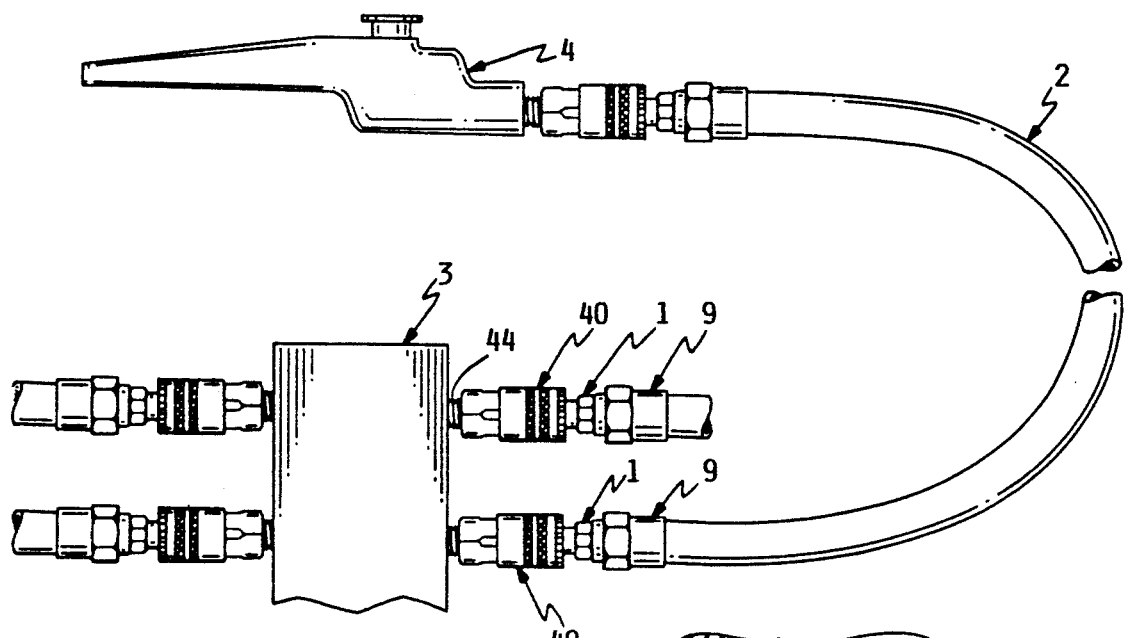
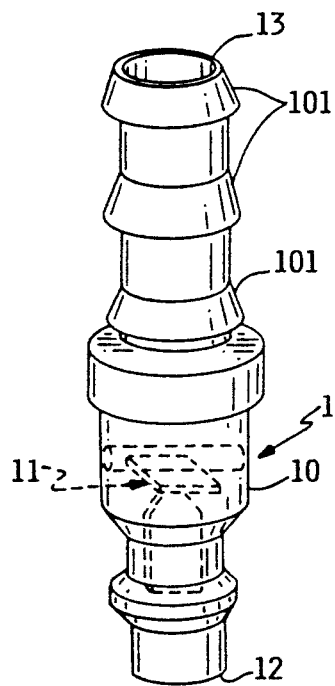
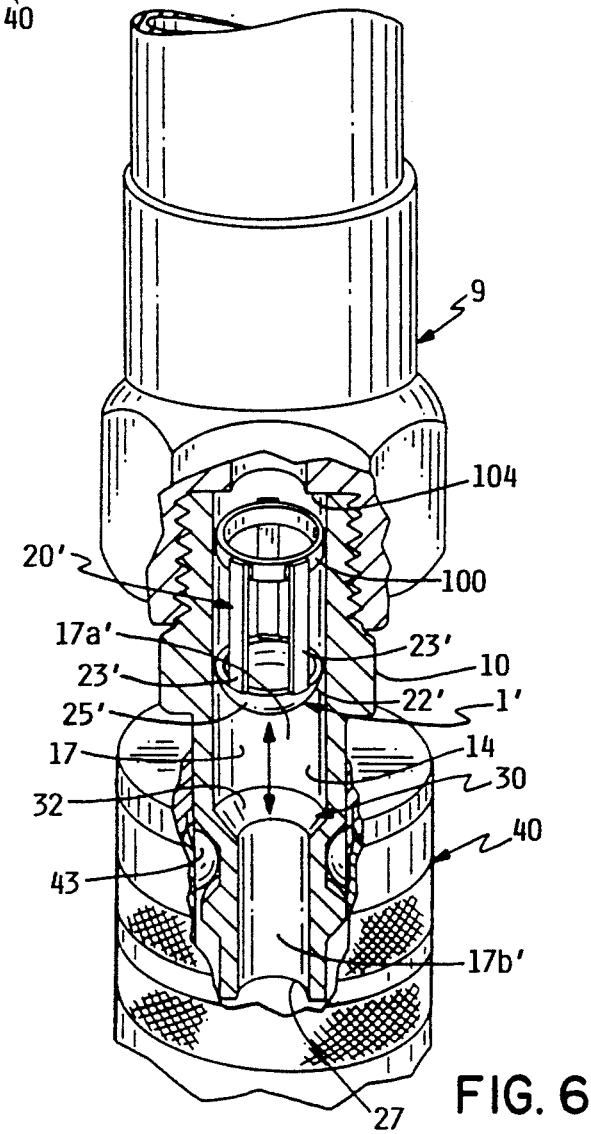
FIG. 1
FIG. 5
FIG. 6

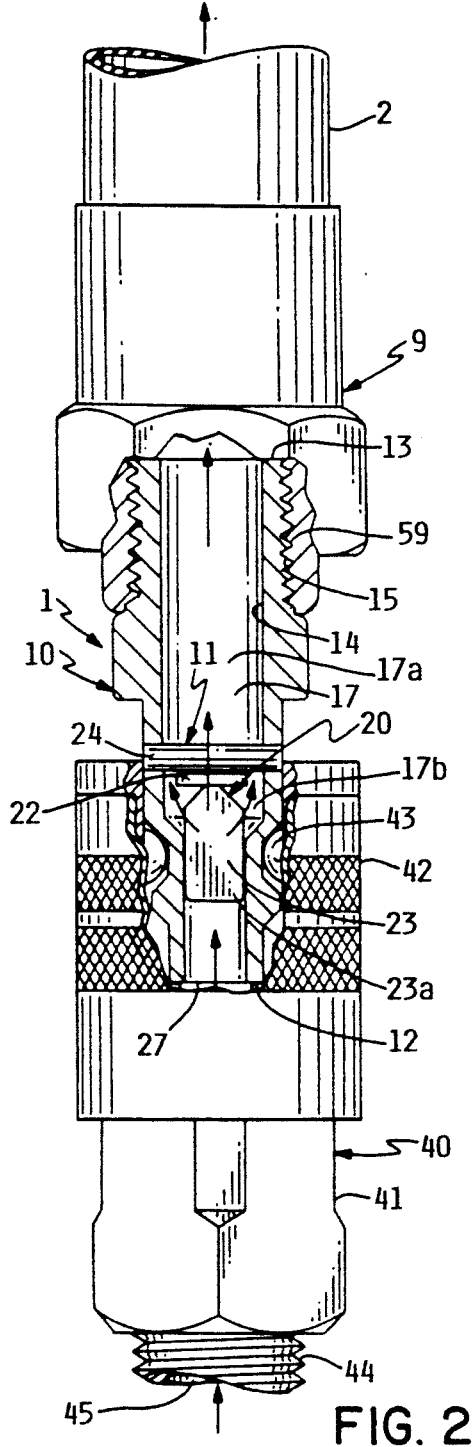
FIG. 4
FIG. 2
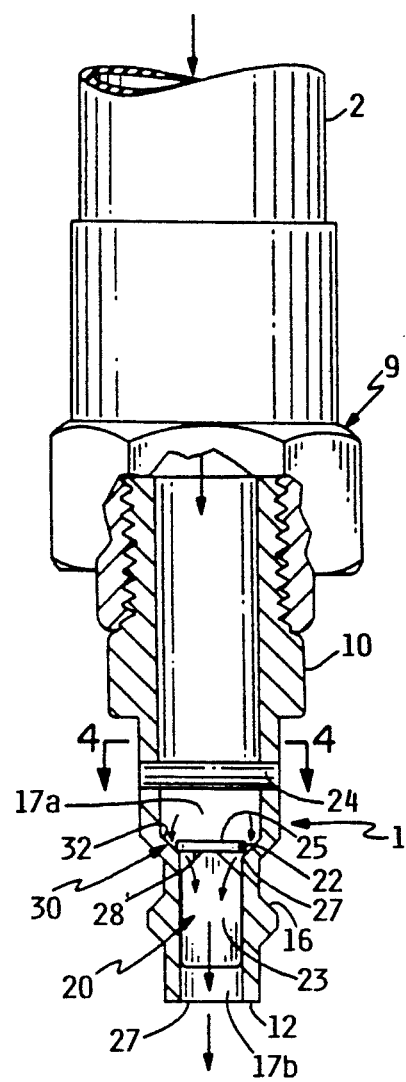
FIG. 3

PNEUMATIC PRESSURE RELIEF ASSEMBLY

CROSS REFERENCE TO RELATED APPLICATIONS

This application is a divisional application of the following co-pending U.S. patent application:
Ser. No.: 07/792,242, now U.S. Pat No. 5,211,192
Filing Date: Nov. 14, 1991
Inventor: William F. Jorgenson
Title: Pneumatic Pressure Relief Assembly.

FIELD OF THE INVENTION

This invention relates to an assembly attachable to a compressed gas supply line which allows a pent up supply of compressed gas trapped in the line to be gradually bled down to atmospheric pressure after the line has been removed from its gas supply source. More particularly, this invention relates to pneumatic tool lines, and the need to safely disconnect the line from its air supply source without the line fishtailing from the rapid release of compressed air.

BACKGROUND OF THE INVENTION

Compressed air and other pressurized gases have long been utilized to operate a variety of tools or other devices. Typically such gases have been routed through supply lines, often flexible lines, from a supply source to the device being operated. In the case of pneumatic tools, flexible reinforced rubber hoses often serve as the supply line to route compressed air from a compressor, supply tank or other air supply source to the tool being powered. The length of the supply line or lines being used may vary widely and generally no limit is imposed. In the case of a work environment such as a repair hanger for modern day aircraft, where a wide variety of rivet guns, drills, screwdrivers and the like are in use for the assembly or repair of very large aircraft, air supply lines may range up to 300 feet in length. Such lines are generally attached to a supply tank, which in turn is connected to a compressor. In such an environment, numerous supply lines would be attached to a corresponding number of connectors on the supply tank. The operating pressure carried by such lines may vary greatly, but it is common to utilize 100-150 psi.

When pneumatic supply lines are in use to power pneumatic tools, the supply lines necessarily have to be disconnected from their source of pressurized air from time to time. This may occur when the line is to be moved to a different air supply source in a different location or it may occur when the tool and line are to be taken out of service as at the end of a work shift. When such disconnection occurs, a certain amount of compressed air remains in the supply line. The female connector on the end of the supply line which attaches to a mating connector at the air supply source has historically provided one of two means to deal with this pent up air supply. In one instance the connector on the supply line would be a self sealing connector such as the well known variety of "quick-disconnect" couplings. In the other instance the connector would be an open connector which would allow the pent up compressed air to immediately vent. In the case of the self sealing connector, the pent up supply of compressed air in the supply line remains at essentially the same pressure as the original air supply source. This pent up air keeps the flexible supply line relatively rigid for a considerable period of time such that it cannot be easily rolled up for storage or for transport. This interferes with the progress of work. In addition, if it is desirable to quickly reconnect the supply line to a supply source, such as when a line is moved from one work location to another, the pent up air in the supply line creates back pressure making it more difficult to reconnect the line to a supply source which is under pressure. For these reasons it is more frequently the case that the connector on the supply line attaching to the air supply source is of the open type so that the lines are able to be immediately emptied of compressed air allowing them to be rolled up or otherwise more easily handled. It is the hazards that are encountered when the air supply line has an open connector that the present invention is intended to address. More specifically, when a supply line with an open type connector is to be disconnected from the supply source connector it is intentionally removed. The tool user may "kick" loose the supply line, by releasing the quick disconnect mechanism, because he or she has his or her hands full with the tool and other portions of the long and bulky line that is being disconnected. When the line is thus disconnected without the handler having his or her hands on the hose end, it will violently fishtail about as the pent up supply of compressed air immediately escapes through the open connector on the supply line. This results from the hose end experiencing a recoil force as the compressed air jets through the open hose connector. Numerous accident reports document serious injuries occurring to workers and bystanders as the result of such pneumatic line use.

SUMMARY OF THE PRESENT INVENTION

In accordance with the present invention there is provided apparatus and methods for preventing the fishtailing of compressed air supply lines when they are being disconnected from a compressed air source. This is accomplished using a pressure relief assembly for restricting flow in one direction and allowing free flow in the opposite direction. The pressure relief assembly is attachable to the supply end of the supply line and is comprised of a housing having an internal passageway and partial flow restriction means positioned within the passageway for restricting flow in one direction and permitting essentially free flow in the reverse direction. In a preferred embodiment the partial flow restriction means include a movable member, retaining means for retaining the movable member in the housing passageway, and a seat formed in the passageway. The cross sectional area occupied by the movable member is smaller than the cross sectional area of the housing passageway. Thus, when compressed air is flowing through the housing passageway from the compressed air source, the movable member floats in the air stream and allows air to flow sufficiently freely around it in the passageway and down the supply line to operate a pneumatic tool or the like. However, when the supply line is removed from the source of compressed air and the pent up compressed air in the supply line reverses flow direction to escape the line, the movable member seats against the seat. The cross sectional area of the movable member is smaller than the cross sectional area of the seat. Thus, when seated, the movable member limits but does not totally block the flow of pent up compressed air out of the supply line. This restricted flow allows the supply line to be emptied fast enough to allow the line to be quickly used, but is insufficient to allow a sufficient volume and velocity of exiting air to cause a recoil force that would whip the supply line about in a fishtailing manner that may be dangerous to bystanders. Alternative designs of the movable member and the seat may also include a variety of barrier members that allow air to flow relatively or essentially freely to power a tool, but which are either permeable or sized and contoured such that when they are "seated", only restricted flow is allowed around or through them in sufficient volume such that fishtailing does not occur. The method of the present invention is directed at slowing the release of pressurized fluid from the free end of a supply line when the line is disconnected from a pressurized fluid source. The method includes the steps of providing in a pressurized fluid line a housing having a passageway portion containing flow restriction means for partially restricting flow of the fluid through the passageway in a first direction and for allowing essentially free flow of fluid through the passageway in a second direction. The restriction means may include a movable member which has a major diameter which is less than the diameter of a first section of the passageway. Also provided in the same passageway is a seat that allows the movable member to seat in such a way as to allow only limited air flow in one direction past the movable member such that pent up compressed fluid in the supply line exits slowly enough to prevent a recoiling or fishtailing of the line.

BRIEF DESCRIPTION OF THE DRAWINGS

The invention is described in more detail hereinafter with reference to the accompanying drawings, wherein like reference characters refer to the same parts throughout the several views and in which:

FIG. 1 is an elevational view of a compressed air supply tank showing supply lines attached to a pneumatic tool;

FIG. 2 is a side view in partial section of the pressure relief assembly inserted between supply line and air supply source with the movable member in its free flow position;

FIG. 3 is a side view in partial section of the pressure relief assembly inserted in the supply line but removed from the air supply coupling with the movable member in its seated flow restricting position;

FIG. 4 is a sectional view along the line 4—4 in FIG. 3 showing the movable member in its seated flow restricting position;

FIG. 5 is a perspective view of the pressure relief assembly showing a housing that is adapted on one end for press fitting into a flexible supply line; and FIG. 6 is a perspective view in partial section showing a second embodiment of the movable member.

DETAILED DESCRIPTION OF THE INVENTION

The pressure relief assembly of this invention is designated by the reference numeral 1 and is intended to be used in a compressed air supply arrangement such as is shown in FIG. 1. One embodiment of the invention is shown in cutaway section in FIGS. 2 and 3 where pressure relief assembly 1 is inserted between a compressed air supply line 2 and an air supply source 3 (shown in FIG. 1). While air supply source 3 is shown in FIG. 1 as a tank having multiple connectors, in the form of couplings 40, attached to it, other air supply sources may also be used in the practice of the present invention. Similarly, the present invention may be practiced with the use of other gases under pressure, not merely compressed air although compressed air is one of the most widely used energy sources for driving or operating pneumatic tools and machinery. In the anticipated practice of the present invention, compressed air supply line 2 is comprised of a flexible line, often made of reinforced rubber. The pneumatic tool 4 which is attached to supply line 2 may have any form and is merely shown as a cleaning nozzle in the embodiment of FIG. 1 by way of example. Typical tools would include rivet guns, drills, screw drivers, hammers and other hand tools, but larger devices and machinery may also be operated in the practice of the present invention.

A general method of connection of pressure relief assembly 1 to an air supply system will first be described. Pressure relief assembly 1 includes, in part, a tubular (e.g. cylindrical) housing 10 having a first end 12, a second end 13, and defining an internal passageway 17 passing therethrough, all shown in FIG. 2. Passageway 17 is comprised of a first section 17a and a second section 17b, the diameter of first section 17a being larger than the diameter of second section 17b. Since the intent of pressure relief assembly 1 is to provide a safe means for venting pent up pressurized air from supply line 2, pressure relief assembly 1 is ideally located at the end of supply line 2 which is intended to be attached to air supply source 3. In the preferred embodiment shown in FIGS. 1 and 2 supply line 2 has at its supply end a female connector 9 having internal threads 59. Second end 13 of housing 10 has exterior threads 15 which match threads 59 allowing housing 10 to be threadably and sealably inserted into female connector 9. Other well known connecting means may also be used to effect a coupling between tubular housing 10 and supply line 2, one of which is shown in FIG. 5 and described subsequently.

First end 12 of tubular housing 10 is intended to be connected to air supply source 3. It is typical in connecting supply lines to an air supply source to utilize what is known in the art as a quick-disconnect coupling such as coupling 40 shown in FIGS. 1 and 2, but other connector types and designs may also be used. In the embodiment shown in FIGS. 1 and 2 coupling 40 is comprised of a fitting 41 having external threads 44 for screwing into a threaded port (not shown) in air supply source 3, and defines an internal air supply bore 45. Coupling 40 includes a sliding sleeve 42 which can move axially along cylindrical fitting 41, being urged into an at-rest position by a recessed spring (not shown). When sliding sleeve 42 is urged out of its at-rest position, a plurality of retaining balls, each designated by the numeral 43, move radially outwardly from an annular recess 16 formed in the exterior surface of tubular housing 10. This movement of sliding sleeve 42 is accomplished by the hand movement of an operator, or by foot movement when a user "kicks" the coupling into disengagement. As is well known in the quick-disconnect art, when balls 43 move radially outwardly there is no longer any force preventing the axial movement of tubular housing 10, and it is possible to easily withdraw tubular housing 10 from its sealed engagement with coupling 40. Also contained in coupling 40 are sealing means (not shown) for sealing off air supply bore 45 when tubular housing 10 is withdrawn from engagement with coupling 40. Upon this occurring, the sealing means of coupling 40 act to seal off bore 45 and pressurized air in air supply source 3 cannot escape through coupling 40.

Having described the type of air supply connections in which the present invention finds value, the construction and operation of pressure relief assembly 1 will now be described in further detail. In the practice of the present invention it is intended to provide for the relatively or essentially free flow of pressurized air in one direction through tubular housing 10 to operate pneumatic tool 4, and to partially restrict flow in the opposite direction when pent up pressurized air in supply line 2 tends to escape after housing 10 has been disconnected from air supply coupling 40. To accomplish this, pressure relief assembly 1 includes flow restriction means for partially restricting flow in one direction (the venting direction) and permitting essentially free flow in the reverse direction (the powering direction). In one preferred embodiment, the flow restriction means are comprised of a movable member 20 positioned within passageway 17 between a seat 30 and retaining means for retaining movable member 20 in passageway 17, as shown in FIG. 2. The retaining means are comprised of a movable member stop 24 shown in FIGS. 2 and 3 and described in more detail subsequently. In the preferred embodiment of FIGS. 2 through 5 movable member 20 is comprised of a plate like barrier member 22 having a top surface 25 with a surface area less than the cross sectional area of first passageway section 17a, thereby allowing pressurized air to flow relatively or essentially freely around barrier member 22, and an underside 28. In one preferred embodiment the area of surface 25 is approximately 0.04 square inches, the cross sectional area of first passageway section 17a is approximately 0.067 square inches, and the cross sectional area of second passageway section 17b is approximately 0.029 square inches. Other sizes may also be used as long as sufficient air is allowed to pass through passageway 17 at a sufficient rate of flow to power tool 4 in the free flow direction, and meet the seating requirement described subsequently. The surface area of barrier member 22 is larger than the cross sectional area of second passageway section 17b. Orienting means are attached to barrier member 22 for keeping movable member 20 axially oriented in passageway 17, specifically with barrier member 22 oriented generally perpendicular to the axis of air flow in passageway 17. This assures that when movable member 20 is resting on seat 30, as will be described in more detail subsequently, barrier member 22 generally spans seat 30 rather than being oriented askew to it. It also assures that barrier member 22 will not be cocked out of generally perpendicular alignment with the axis of flow when it is resting against stop 24 thereby preventing it from being somehow wedged into engagement with stop 24 or escaping past stop 24.

In the embodiment shown in FIG. 2 the orienting means are comprised of a bar like orienting member, herein identified as post member 23, attached to underside 28 of barrier member 22, the longitudinal axis of member 23 being generally perpendicular to surface 25. The length of post member 23 is such that if member 23 tends to move laterally in passageway 17, its lower end, designated by the numeral 23a, impacts the side wall of passageway 17, thereby preventing surface 25 from being oriented so far off of perpendicular with the air flow direction so as to allow barrier member 22 to not lie generally flush across seat 30. It being understood that the various dimensions across passageway 17, of barrier member 22 and of post member 23 are interrelated, and may vary so long as the stated objective of keeping the flow of pent up air from supply line 2 from twisting barrier member 22 out of relatively flush engagement with seat 30 is achieved. In the preferred embodiment, the dimensions of generally square surface 25 are approximately 0.200 inches by 0.200 inches, the diameter of first passageway section 17a is approximately 0.292 inches and the length of post member 23 is approximately 0.3125 inches.

To prevent movable member 20 from being carried into supply line 2 by the flow of air from air supply source 3, the retaining means for retaining the movable member in the passageway are comprised of stop 24 which is cylindrically shaped and extends across passageway 17 a relatively short distance from seat 30, as shown in FIGS. 2 and 3. The longitudinal axis of stop 24 is oriented generally perpendicular to the longitudinal axis of passageway 17. The diameter of stop 24 should be sufficiently small so as to allow sufficient flow past barrier member 22 and through passageway 17 to power tool 4, such diameter being approximately 0.093 inches in the preferred embodiment described herein. Thus, when the flow of supply air out of supply source 3 urges movable member 20 in the direction of tool 4, stop 24 keeps movable member 20 positioned generally within approximately 0.10 inches of seat 30 in the preferred embodiment described. This relatively close spacing also allows movable member 20 to move against seat 30 relatively quickly when flow is reversed, thus, quickly preventing recoiling and fishtailing forces from developing.

It is the intent of seat 30 to engage, and "seat" barrier member 22 when movable member 20 is urged toward it by pent up air in supply line 2, which tends to escape after supply line 2 is disconnected from coupling 40. As shown in FIGS. 2 and 3, seat 30 is formed by a necking down of the cross sectional area of passageway 17 from first section 17a to second section 17b to form a sloped annular surface 32. Because there can only be restricted flow past movable member 20 when it is seated on seat 30, the engagement between barrier member 22 and seat 30 must be such that some air can flow between barrier member 22 and seat 30 to evacuate the pent up pressurized air, but insufficient air flow (measured in both velocity and volume) occurs to create a recoiling force as air escapes out of opening 27 formed by passageway 17 at first end 12 of housing 10, shown in FIG. 2. This is accomplished in the preferred embodiment by forming barrier member 22 with a generally square planform for surface 25, as shown in FIG. 4. The underside 28 of barrier member 22 is generally flat. As shown in FIG. 4, when the generally square barrier member 22 "seats" or engages sloped annular surface 32, each of a plurality of corners, each designated by the numeral 29 in FIG. 4, of rectangular barrier member 22 intersects a portion of sloped annular surface 32, and this "seats" movable member 20 on seat 30. When this occurs, each of the sides of barrier member 22, in combination with the rounded and sloped wall portions of annular surface 32 which are opposite them, define a plurality of four open areas, each designated by the numeral 33 in FIG. 4. The major diameter of surface 25, measured across opposing corners 29, is larger than the diameter of second passageway section 17b and smaller than the diameter of first passageway section 17a. The angular slope of surface 32 may vary as long as the stated objectives of gradual bleed down are achieved, but in the preferred embodiment the slope of surface 32 is approximately 45 degrees. Thus, when movable member 20 is seated, open areas 33 provide passageways through which pent up pressurized air in supply line 2 may flow around movable member 20 and out of opening 27. Because the combined open area provided by open areas 33 is less than the cross sectional area of passageway 17, the blocking effect of barrier member 22 serves to meter or restrict the outward flow of pent up compressed air past barrier member 22. This restriction of the compressed air which flows out of opening 27 serves to reduce the reactive pressure which tends to result from the rapid escape of air through opening 27 sufficiently to prevent housing 10, and supply line 2 to which it is attached, from recoiling so as to whip or fishtail about in a random and violent manner. This avoids any injuries which may otherwise result therefrom. It being understood that other dimensions and shapes of interface between barrier member 22 and seat 30 may be utilized so long as restriction of flow therethrough occurs.

While the forgoing embodiment incorporates a partial flow restriction means which utilizes a movable member that moves axially in passageway 17, the present invention need not be restricted to such a piston like movable member for the restriction mean. A variety of movable members that do not move axially, but which are hinged on one side edge or are otherwise mounted to act as "flappers" while at the same time only allowing partial flow past them when "seated" may also be used to accomplish the stated means. The retaining means of such devices may be any variety of device, perhaps providing a hinge or bellows type of retention. Also, the "seat" that provides open space between the passageway cross section and the movable member, may be represented by any irregular interface between the passageway 17 and the barrier member being used such that would allow only restricted flow thereby in one direction and relatively free flow in the other direction. For instance a ribbed cone may be the movable member, with the cone fulcrum being the orienting means, and the ribs providing the air passageway adjacent the seat. One specific alternative embodiment is described below.

In the alternative embodiment of pressure relief assembly 1' shown in FIG. 6, the flow restriction means for partially restricting flow of compressed gas through the passageway from the direction of the tool and allowing essentially free flow of compressed gas in the opposite direction is comprised of movable member 20' positioned in passageway 17 between the retaining means for retaining the movable member in the passageway and seat 30. Seat 30 has the structure described earlier in reference to FIGS. 2 and 3. The retaining means are comprised of a shoulder 104 formed in passageway 17 against which support ring 100 would rest restricting further movement of movable member 20' in the direction of tool 4. Movable member 20' is comprised of a barrier member 22' having a curved portion designated as rounded surface 25' in FIG. 6, and a spacer portion comprising, in part, orienting means for keeping the movable member axially oriented. Barrier member 22' has a major diameter greater than the diameter of passageway second section 17b'. The spacer portion is comprised of a plurality of three orienting post members, each designated by the numeral 23', and a support ring 100, all shown in FIG. 6. Post members 23' are elongated bars extending between, and attached to, support ring 100 and barrier member 22'. Support ring 100, barrier member 22' and post members 23' are sized so that open space exists between the maximum outside diameter of movable member 20' and the diameter of passageway section 17a' to allow movable member 20' to freely move axially within passageway 17. The length of post members 23' and the diameter of barrier member 22' are selected in relation to the diameter of passageway 17 such that post members 23' prevent barrier member 22' from being cocked sideways in a manner that would prevent barrier member 22' from being oriented with its width generally spanning annular surface 32. Barrier member 22' has a cross sectional area that is less than the cross sectional area of first passageway section 17a' such that air can flow around movable member 20' when it is held against shoulder 104 allowing sufficient air flow to power tool 4. When air flow is reversed, and air moves rearwardly through supply line 2, movable member 20' is urged into engagement with seat member 30. The maximum exterior diameter of the spacer portion of movable member 20' comprised of the irregular annular structure formed by, and measured at, the outside lower surfaces of post members 23' where they attach to member 22', is sized such that when movable member 20' seats against seat 30, the ends of post members 23' impact against sloped annular surface 32 with space existing between annular surface 32 and the portions of surface 25' that are opposite it to form a passageway (the seated position of movable member 20' not being shown in FIG. 6) therebetween. The cumulative area of this passageway is less than the cross sectional area of second passageway section 17b, the exact relationship being somewhat variable and in the range of opening size between seat 30 and barrier member 22 described for the embodiment of FIGS. 2 and 3. Thus, air flowing around movable member 20' when it is seated is restricted to the reduced cross sectional area surrounding barrier member 22' to such an extent that the volume and velocity of pent up air escaping from supply line 2 is insufficient to cause the end of supply line 2 to which it is attached to fishtail such that it could cause injury.

FIG. 5 shows an alternative design of tubular housing 10 where a plurality of annular collars, each designated by the numeral 101, are provided. Annular collars 101 are positioned on the exterior surface of the second end 13 of housing 10 and are intended to be forcibly inserted into the open end of a flexible rubber supply line 2 so as to retain housing 10 therein, as is well known in the art. This would be an alternative means of mounting pressure relief assembly 1, and housing 10 in particular, into the end of a supply line 2.

The method of the present invention is directed at restricting the flow of a compressed fluid, such as compressed gas, from a supply line when the line is disconnected from the supply of compressed gas. Essentially free flow of gas is allowed in the opposite direction to allow gas to power a tool attached to the supply line. The method includes the steps of providing a housing 10, as shown in FIGS. 2 through 6, and having a passageway 17 extending therethrough. Passageway 17 has a first section and a second section, the diameter of the first section being larger than the diameter of the second section. Restriction means are provided in passageway 17 for partially restricting the flow of gas through the passageway in a first direction as when the line is disconnected from a supply source, and for allowing essentially free flow through the passageway in the opposite direction when a tool 4 attached to the line is to be powered from a supply source 3. The restriction means may be provided with a movable member 20 having a barrier member 22 with a diameter smaller than first passageway section 17a and larger than the diameter of second passageway section 17b. A seat 30 having a sloped annular surface 32 formed between first and second passageway sections 17a and 17b, respectively is provided to engage barrier member 22 in such a manner that partial flow of air between barrier member 22 and surface 32 is provided. An orienting member is also provided, comprising a post member, for orienting barrier member 22 generally coplanar with the plane of seat 30. Barrier member 22 may have a curved portion 25' as shown in FIG. 6 which interfaces with, and is held apart from, surface 32 by means of a spacer portion formed from barrier member 22' and a plurality of post members 23'.

Obviously, many modifications and variations of the present invention are possible in light of the above teachings. It is therefore to be understood that, within the scope of the appended claims, the invention may be practice otherwise than as specifically described.

What is claimed is:

1. A pressure relief assembly for use in a supply line which carries compressed gas from a source to a tool or the like to prevent the supply line from fishtailing when said supply line is disconnected from said source and compressed gas contained in said supply line is suddenly released, said assembly comprising:
    (a) a housing attachable to said supply line and having first and second ends; wherein said housing includes a first passageway extending between said first and second ends, said first passageway comprising first and second sections, each having a cross sectional area, said first section having a cross sectional area which is larger than the cross sectional area of said second section;
    (b) an annular surface connecting said first and second passageway sections;
    (c) restriction means for partially restricting flow of compressed gas through said first passageway from the direction of said tool; wherein said restriction means allow essentially free flow of compressed gas through said first passageway in a direction toward said tool;
    (d) said restriction means comprising a movable member having a cross sectional area which is less than the cross sectional area of said first section of said first passageway and greater than the cross sectional area of said second section, wherein said movable member moves toward said annular surface when said supply line is disconnected from said compressed gas source;
    (e) said movable member including a curved portion; and
    (f) at least one spacer member operably positioned between said curved portion and said annular surface when they are juxtaposed opposite one another to form a defined open area between said first passageway first and second portions when said curved portion seats against said annular surface such that the normal flow of compressed gas through said second portion is restricted.

2. A pressure relief assembly in accordance with claim 1 further comprising retaining means for retaining said movable member in said first section of said first passageway.

3. A method for slowing the release of compressed gas from the free end of a supply line when said supply line is disconnected from a compressed gas source; wherein said method comprises the steps of:
    (a) providing a housing having first and second ends and a first passageway extending between said ends, wherein said first passageway comprises first and second sections, each having a cross sectional area, and an annular surface connecting said first and second sections; wherein said first section has a larger cross sectional area than said second section;
    (b) providing restriction means in said first passageway for partially restricting flow of said compressed gas through said first passageway in a first direction and for allowing essentially free flow of gas thorough said first passageway in a second direction, wherein said restriction means comprises a movable member which has a cross sectional area which is less than the cross sectional area of said first section of said first passageway and greater than the cross sectional area of said second section; wherein said movable member moves toward said annular surface when said supply line is disconnected from said compressed gas source;
    (c) providing said movable member having a curved portion;
    (d) providing at least one spacer member operably positioned between said curved portion and said annular surface when they are juxtaposed opposite one another to form a defined open area therebetween said first passageway first and second portions when said curved portion seats against said annular surface such that the normal flow of compressed gas through said second portion is restricted; wherein said curved portion is adapted to move toward said annular surface to partially restrict flow of compressed gas thorough said first passageway; wherein said spacer member prevents said curved portion from sealing against said annular surface; and
    (e) connecting said second end of said housing to said free end of said supply line.

4. A method in accordance with claim 3, further comprising providing retaining means for retaining said movable member in said first section of said first passageway.

* * * * *